(12) United States Patent
Kim et al.

(10) Patent No.: US 11,140,589 B2
(45) Date of Patent: Oct. 5, 2021

(54) METHOD AND APPARATUS FOR HANDLING FAILURE OF EARLY DATA TRANSMISSION IN WIRELESS COMMUNICATION SYSTEM

(71) Applicant: LG ELECTRONICS INC., Seoul (KR)

(72) Inventors: Hongsuk Kim, Seoul (KR); Youngdae Lee, Seoul (KR); Bokyung Byun, Seoul (KR); Jaewook Lee, Seoul (KR)

(73) Assignee: LG ELECTRONICS, INC, Seoul (KR)

( * ) Notice: Subject to any disclaimer, the term of this patent is extended or adjusted under 35 U.S.C. 154(b) by 78 days.

(21) Appl. No.: 16/633,537

(22) PCT Filed: Aug. 7, 2018

(86) PCT No.: PCT/KR2018/008973
§ 371 (c)(1),
(2) Date: Jan. 23, 2020

(87) PCT Pub. No.: WO2019/031820
PCT Pub. Date: Feb. 14, 2019

(65) Prior Publication Data
US 2020/0236598 A1    Jul. 23, 2020

Related U.S. Application Data

(60) Provisional application No. 62/542,321, filed on Aug. 8, 2017.

(51) Int. Cl.
*H04W 36/00* (2009.01)
*H04W 76/11* (2018.01)
(Continued)

(52) U.S. Cl.
CPC ... *H04W 36/0079* (2018.08); *H04W 74/0833* (2013.01); *H04W 76/11* (2018.02); *H04W 76/27* (2018.02)

(58) Field of Classification Search
None
See application file for complete search history.

(56) References Cited

U.S. PATENT DOCUMENTS 9,313,807 B2 *   4/2016   Park ................... H04W 74/0833
9,661,510 B2 *   5/2017   Johansson ........... H04L 41/0631
(Continued)

FOREIGN PATENT DOCUMENTS

KR   20170049282   5/2017
WO   2012019339    2/2012

OTHER PUBLICATIONS

PCT International Application No. PCT/KR2018/008973, International Searching Authority dated Nov. 13, 2018, 2 pages.

*Primary Examiner* — Bunjob Jaroenchonwanit
(74) *Attorney, Agent, or Firm* — Lee, Hong, Degerman, Kang & Waimey

(57) ABSTRACT

A method and apparatus for transmitting data in a wireless communication system is provided. A user equipment (UE) transmits the data in a first cell during a first random access procedure, i.e. early data transmission. The UE detects that transmission of the data in the first cell during the first random access procedure has failed, and prioritizes a second cell based on candidate cell information. After selecting the second cell, the UE transmits a failed part of the data in the second cell during a second random access procedure.

14 Claims, 9 Drawing Sheets

(51) Int. Cl.
*H04W 76/27* (2018.01)
*H04W 74/08* (2009.01)

(56) References Cited

U.S. PATENT DOCUMENTS

| | | | | |
|---|---|---|---|---|
| 9,866,351 B2* | 1/2018 | Sazawa | H04L 45/28 | |
| 2009/0316758 A1* | 12/2009 | Ahn | H04B 1/7143 | 375/135 |
| 2010/0279692 A1* | 11/2010 | Hapsari | H04W 36/02 | 455/436 |
| 2011/0261763 A1* | 10/2011 | Chun | H04W 74/008 | 370/329 |
| 2012/0039295 A1* | 2/2012 | Quan | H04W 74/085 | 370/329 |
| 2012/0264368 A1* | 10/2012 | Aminaka | H04B 7/155 | 455/9 |
| 2013/0039314 A1* | 2/2013 | Prateek | H04W 74/08 | 370/329 |
| 2014/0169323 A1* | 6/2014 | Park | H04W 72/042 | 370/329 |
| 2014/0293889 A1* | 10/2014 | Mahr | H04L 1/1825 | 370/329 |
| 2014/0355539 A1* | 12/2014 | Yang | H04L 1/1887 | 370/329 |
| 2014/0362794 A1* | 12/2014 | Zhao | H04W 74/04 | 370/329 |
| 2015/0349930 A1* | 12/2015 | Sazawa | H04L 41/0896 | 370/254 |
| 2016/0192376 A1* | 6/2016 | Lee | H04W 72/0406 | 370/252 |
| 2016/0192420 A1* | 6/2016 | Kim | H04W 74/002 | 370/329 |
| 2016/0302151 A1* | 10/2016 | Jung | H04W 76/18 | |
| 2016/0381711 A1* | 12/2016 | Kim | H04W 72/04 | 370/329 |
| 2017/0126480 A1* | 5/2017 | Youtz | H04W 74/0833 | |
| 2017/0367015 A1* | 12/2017 | Zhang | H04W 36/305 | |
| 2018/0139011 A1* | 5/2018 | Chae | H04L 1/1861 | |
| 2018/0359786 A1* | 12/2018 | Phuyal | H04W 48/20 | |
| 2019/0190657 A1* | 6/2019 | Sun | H04L 1/1858 | |
| 2020/0045686 A1* | 2/2020 | Lee | H04W 74/0833 | |
| 2020/0059390 A1* | 2/2020 | Zhang | H04L 1/0004 | |
| 2020/0068547 A1* | 2/2020 | Li | H04W 76/18 | |
| 2020/0107385 A1* | 4/2020 | Adjakple | H04W 76/15 | |
| 2020/0296772 A1* | 9/2020 | Babaei | H04W 74/0833 | |
| 2020/0305094 A1* | 9/2020 | Ouchi | H04L 5/0055 | |
| 2021/0067941 A1* | 3/2021 | Basu Mallick | H04W 8/00 | |
| 2021/0136832 A1* | 5/2021 | Agiwal | H04W 74/085 | |

* cited by examiner

METHOD AND APPARATUS FOR HANDLING FAILURE OF EARLY DATA TRANSMISSION IN WIRELESS COMMUNICATION SYSTEM

CROSS-REFERENCE TO RELATED APPLICATIONS

This application is the National Stage filing under 35 U.S.C. 371 of International Application No. PCT/KR2018/008973, filed on Aug. 7, 2018, which claims the benefit of U.S. Provisional Application No. 62/542,321, filed on Aug. 8, 2017, the contents of which are all hereby incorporated by reference herein in their entirety.

TECHNICAL FIELD

The present invention relates to wireless communications, and more particularly, to a method and apparatus for handling a failure of early data transmission in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future. The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

With the introduction of narrowband internet-of-things (NB-IoT) in Rel-13 and its enhancement to support positioning, multi-cast, reduced latency and power consumption, and non-anchor carrier operation in Rel-14, NB-IoT is a technology which addresses a very wide range of the use cases and applications for cellular machine-to-machine (M2M) technologies. Further enhancements are proposed to enable NB-IoT to support the IoT ecosystem as it develops to have a wide range of applications, deployments, and device types, whilst continuing the focus on a very low cost UE with deep coverage support and high connection capacity.

SUMMARY

Early data transmission is introduced for enhancing NB-IoT in Rel-15. Failure cases of the early data transmission should be handled efficiently.

In an aspect, a method for transmitting data by a user equipment (UE) in a wireless communication system is provided. The method includes transmitting the data in a first cell during a first random access procedure, detecting that transmission of the data in the first cell during the first random access procedure has failed, prioritizing a second cell based on candidate cell information, and transmitting a failed part of the data in the second cell during a second random access procedure.

In another aspect, a user equipment (UE) in a wireless communication system is provided. The UE includes a memory, a transceiver, and a processor, coupled to the memory and the transceiver, that controls the transceiver to transmit the data in a first cell during a first random access procedure, detects that transmission of the data in the first cell during the first random access procedure has failed, prioritizes a second cell based on candidate cell information, and controls the transceiver to transmit a failed part of the data in the second cell during a second random access procedure.

When early data transmission is failed in one cell, failed part of the early data transmission can be transmitted in another cell supporting the early data transmission.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
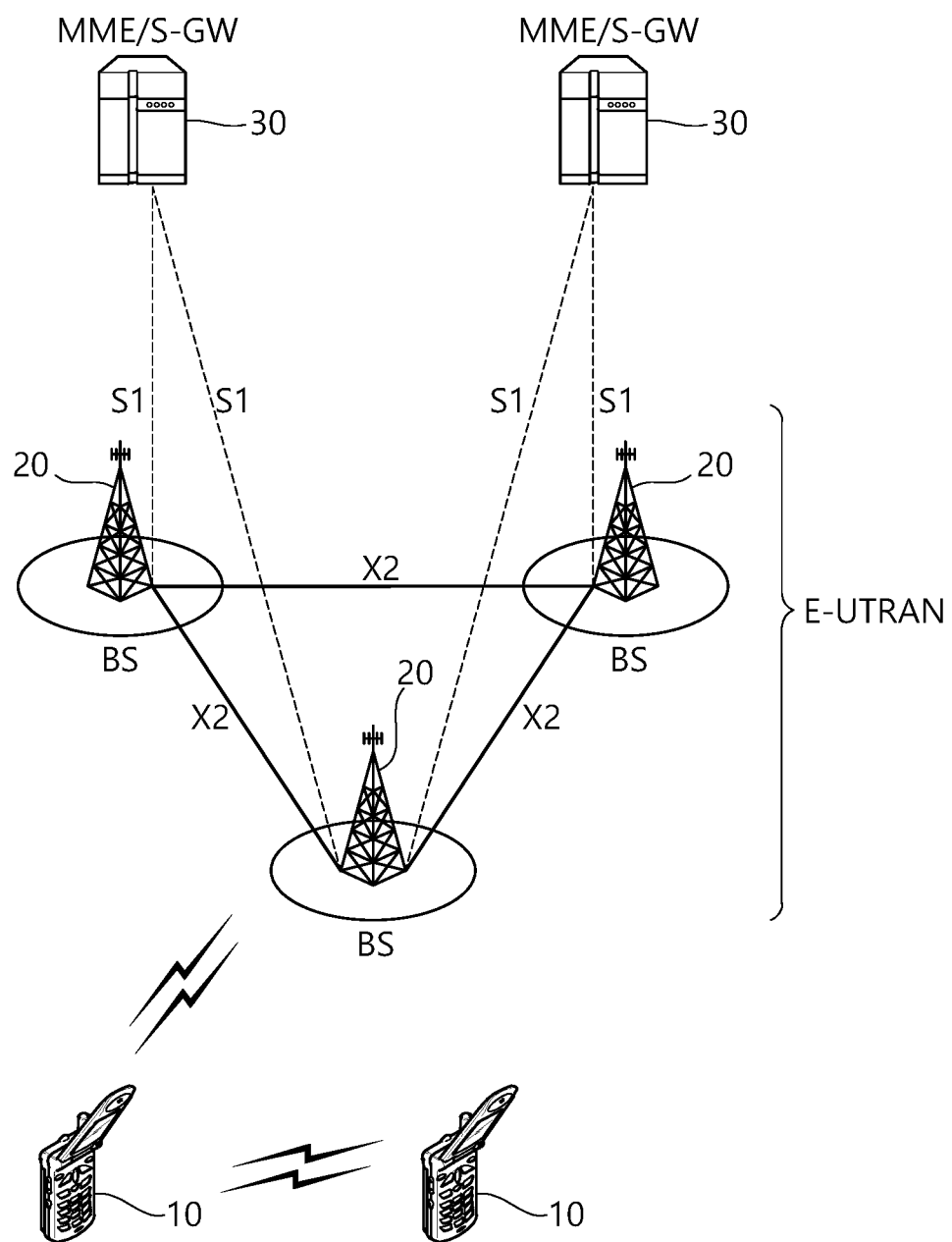
FIG. 1 shows an example of a wireless communication system to which technical features of the present invention can be applied.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UMTS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
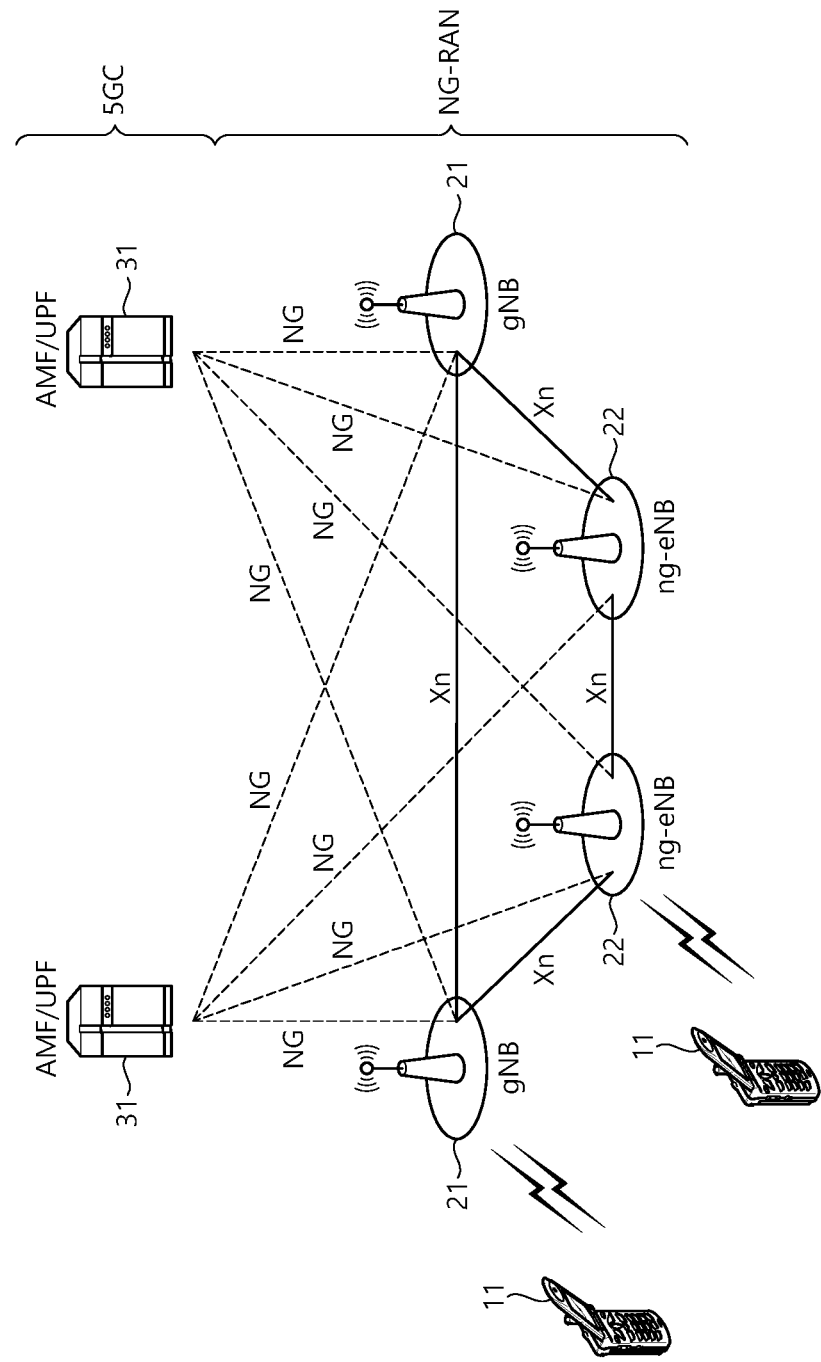
FIG. 2 shows another example of a wireless communication system to which technical features of the present invention can be applied.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NW") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 3:
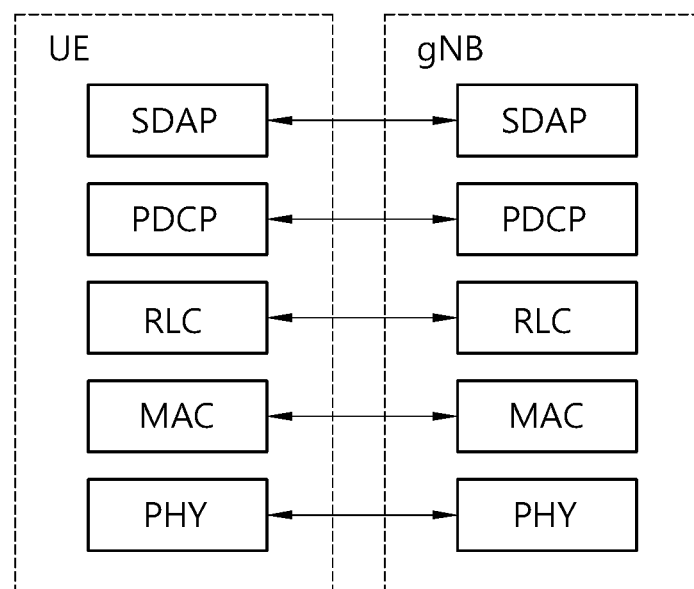
FIG. 3 shows a block diagram of a user plane protocol stack to which technical features of the present invention can be applied.
Figure 4:
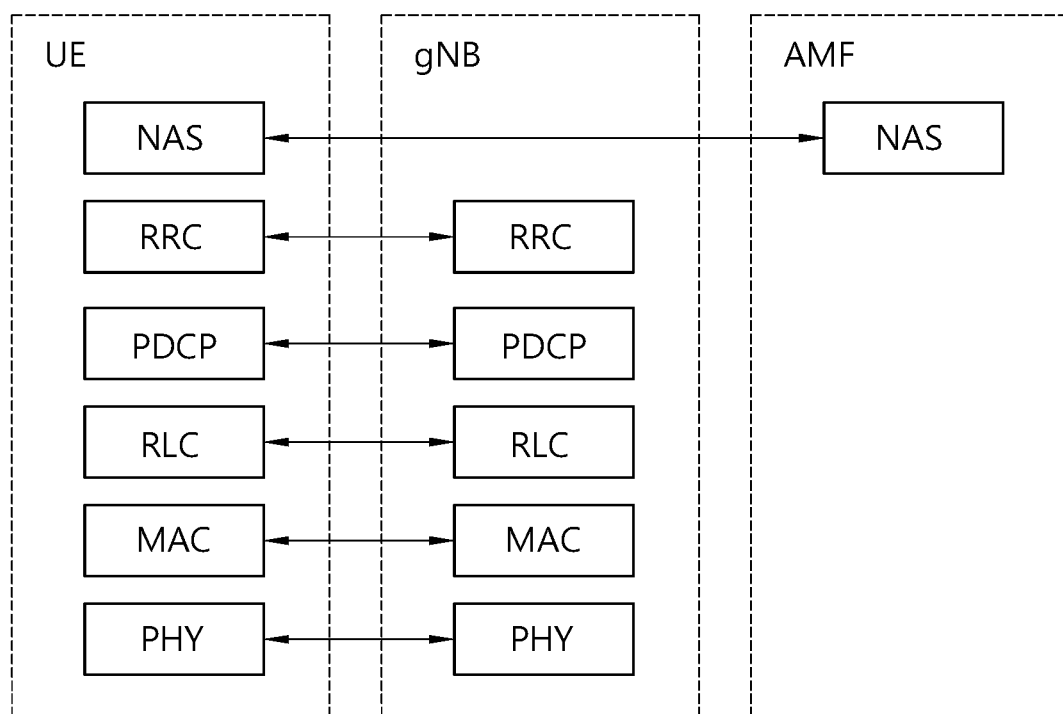
FIG. 4 shows a block diagram of a control plane protocol stack to which technical features of the present invention can be applied.

FIG. 3 shows a block diagram of a user plane protocol stack to which technical features of the present invention can be applied. FIG. 4 shows a block diagram of a control plane protocol stack to which technical features of the present invention can be applied. The user/control plane protocol stacks shown in FIG. 3 and FIG. 4 are used in NR. However, user/control plane protocol stacks shown in FIG. 3 and FIG. 4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only.

In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

A random access procedure is described.

Figure 5:
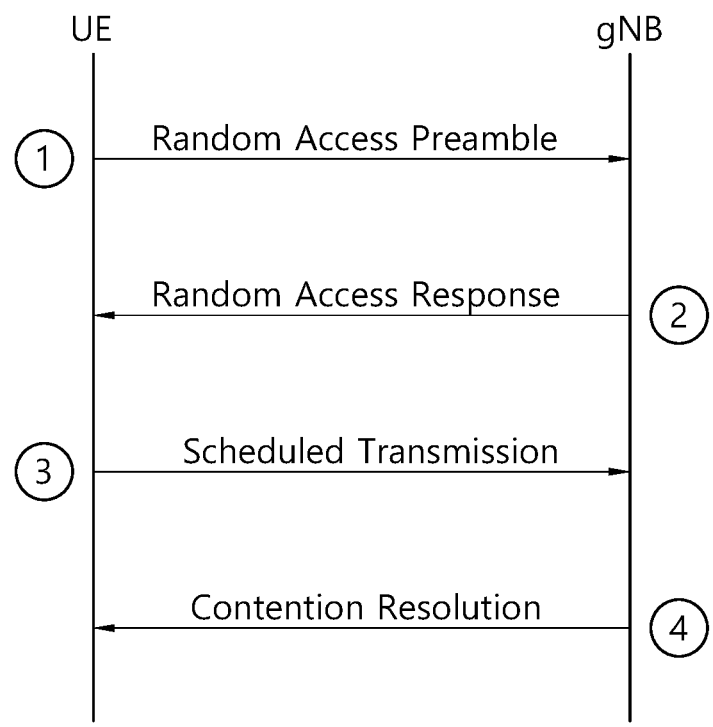
FIG. 5 shows a contention based random access procedure.

FIG. 5 shows a contention based random access procedure.

1. A random access preamble (may be referred to as "MSG1") is transmitted on RACH in UL. A UE randomly selects one random access preamble from a set of random access preambles indicated by system information or a handover command, selects a PRACH resource able to transmit the random access preamble, and transmits the same.

2. After the random access preamble is transmitted, the UE attempts to receive a random access response (may be referred to as "MSG2") hereof generated by MAC on DL-SCH within a random access response reception window indicated by the system information or the handover command. In detail, the random access response information is transmitted in the form of a MAC PDU, and the MAC PDU is transferred on a physical downlink shared channel (PDSCH). In order to allow the UE to properly receive the information transmitted on the PDSCH, a PDCCH is also transferred together. Namely, the PDCCH includes information regarding a UE which is to receive the PDSCH, frequency and time information of radio resource of the PDSCH, a transmission format of the PDSCH, and the like. When the UE successfully receives the PDCCH destined therefor, the UE appropriately receives the random access response transmitted on the PDSCH according to the information items of the PDCCH. The random access response includes a random access preamble identifier (ID), a UL grant (uplink radio resource), a temporary cell radio network temporary identity (C-RNTI), and a time alignment command (TAC). In the above, the reason why the random access preamble identifier is required is because, since a single random access response may include random access response information for one or more UEs, so the random access preamble identifier informs for which UE the UL grant, temporary C-RNTI, and TAC are valid. The random access preamble identifier is identical to a random access preamble selected by the UE in 1.

3. When the UE receives the random access response valid therefor, the UE processes the information items included in the random access response. Namely, the UE applies the TAC and stores the temporary C-RNTI. Also, the UE transmits scheduled data (may be referred to as "MSG3") stored in a buffer thereof or newly generated data to the BS by using the UL grant on UL-SCH. In this case, an identifier of the UE should be included in the data included in the UL grant. The reason is because, in the contention based random access procedure, the BS cannot determine which UEs perform the random access procedure, so in order to resolve collision later, the BS should identify UEs. Also, there are two types of methods for including an identifier of the UE. A first method is that when the UE has a valid cell identifier already allocated in the corresponding cell before the random access procedure, the UE transmits its cell identifier through the UL grant. Meanwhile, when the UE has not been allocated a valid cell identifier before the random access procedure, the UE includes its unique identifier (e.g. a SAE-temporary mobile subscriber identity (S-TMSI) or a random ID) in data and transmits the same. In general, the unique identifier is longer than a cell identifier. When the UE transmits the data through the UL grant, the UE starts a contention resolution timer.

4. After the UE transmits the data including its identifier through the UL grant included in the random access response, the UE waits for an instruction from the BS for a collision resolution (may be referred to as "MSG4"). Namely, in order to receive a particular message, the UE attempts to receive a PDCCH. There are two methods for receiving a PDCCH. As mentioned above, when the identifier of the UE transmitted through the UL grant is a cell identifier, the UE attempts to receive a PDCCH by using its cell identifier, and when the identifier is a unique identifier, the UE attempts to receive a PDCCH by using the temporary C-RNTI included in the random access response. Hereafter, in the former case, when a PDCCH is received through its cell identifier before the contention resolution timer expires, the UE determines that the random access procedure has been normally performed, and terminates the random access procedure. In the latter case, when the UE receives a PDCCH through the temporary cell identifier before the contention resolution time expires, the UE checks data transferred by the PDSCH indicated by the PDCCH. When the data content includes its unique identifier, the UE determines that the random access procedure has been normally performed, and terminates the random access procedure.

Figure 6:
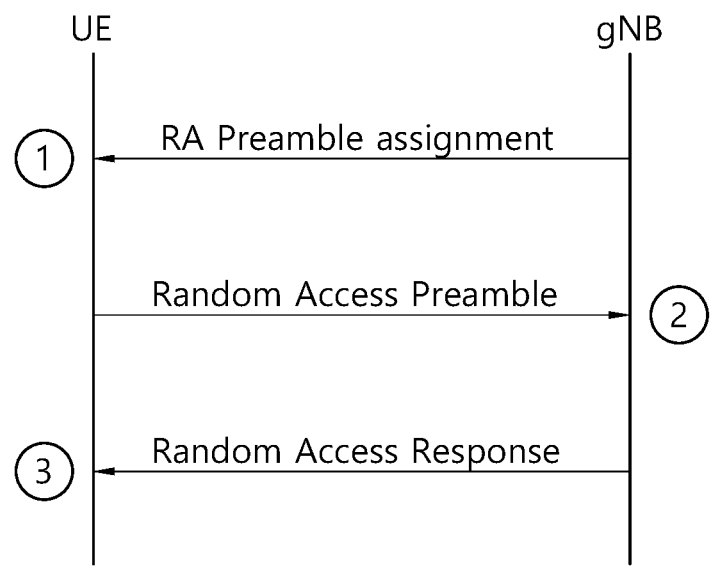
FIG. 6 shows a contention free random access procedure.

FIG. 6 shows a contention free random access procedure.

0. For the non-contention based random access procedure, it is important to receive a designated random access preamble eliminating a possibility of collision. A method of receiving an indication of the random access preamble includes a handover command and a PDCCH command.

1. After receiving the allocated random access preamble designated only for the UE, the UE transmits the preamble to the BS.

2. A method of receiving random access response information is the same as that in the contention-based random access procedure.

Narrowband internet-of-things (NB-IoT) and early data transmission are described. NB-IoT provides access to network services using physical layer optimized for very low power consumption. For example, full carrier bandwidth may be 180 kHz, which is significantly narrower than typical carrier bandwidth. Subcarrier spacing may be 3.75 kHz or 15 kHz). A number of E-UTRA protocol functions supported by all Rel-8 UEs are not used for NB-IoT and need not be supported by eNBs and UEs only using NB-IoT.

For Rel-15, latency and power consumption reduction are supposed to be discussed as further enhancement in NB-IoT or MTC. To achieve latency and power consumption reduction for NB-IoT, early data transmission has been introduced in Rel-15. Early data transmission is DL/UL data transmission on a dedicated resource during the random access procedure after NB-IoT physical random access channel (NPRACH) transmission and before the RRC connection setup is completed. Specifically, the UE can transmit data during the random access procedure by using MSG3, e.g. RRC connection request message (RRCConnectionRequest message) or RRC connection resume request message (RRCConnectionResumeRequest message).

Due to early data transmission, the UE can transmit data more quickly before entering RRC_CONNECTED and the UE can release the RRC connection more quickly if the UE does not have to wait for further DL data. Therefore, latency can be reduced. Furthermore, since it is expected that a size of data to be transmitted in NB-IoT is relatively small, it may be a burden to UE to establish connection with the network whenever data is to be transmitted. Therefore, power consumption can be reduced by early data transmission.

To support the early data transmission, various conditions should be considered. Specifically, failure cases of the early data transmission should be handled importantly. Some solutions may be needed to support the failure handling for the early data transmission.

Hereinafter, a method for handling a failure of early data transmission is described according to embodiments of the present invention. In the description below, performing early data transmission means that data is transmitted during the random access procedure, e.g. via MSG3.

According to an embodiment of the present, early data transmission, i.e. transmission of data during the random access procedure, may be failed. When the UE tries to transmit multiple PDUs during the random access procedure, only a part of the multiple PDUs may be failed to be transmitted. In this case, if there is any information about candidate cells to perform data transmission on other cell, the UE may prioritize the candidate cells for cell reselection. The candidate cells may support the early data transmission. The information about the candidate cells may be obtained by various methods, which will be described below in detail. Early data transmission may be failed in the following cases.

When RRC connection request or RRC connection resume request is rejected by the network, i.e. RRC connection reject message (RRCConnectionReject message) is received;

When cell reselection is performed while timers T300, T302, T303, T305, T306, or T308 is running;

When timer T300 expires: The timer 300 starts by transmission of RRCConnectionRequest message or RRCConnectionResumeRequest message.

Then, the UE may (re)select one of the candidate cells, and may perform early data transmission on the selected cell. The UE may transmit the failed part of the data transmission on the selected cell during the random access procedure. Specifically, the UE may try to transmit multiple PDUs on the previous cell during the random access procedure, and only a part of the multiple PDUs may be successfully transmitted. The UE may receive acknowledgement (ACK) from the network as a response to PDUs successfully transmitted, and may receive non-acknowledgement (NACK) from the network as a response to PDUs not successfully transmitted. In this case, the UE may transmit the rest of the data except data for which ACK is received from the network. That is, the UE may retransmit the data for which NACK is received from the network. The UE may transmit data for any result is not yet received from the network or data not yet transmitted to the network.

Figure 7:
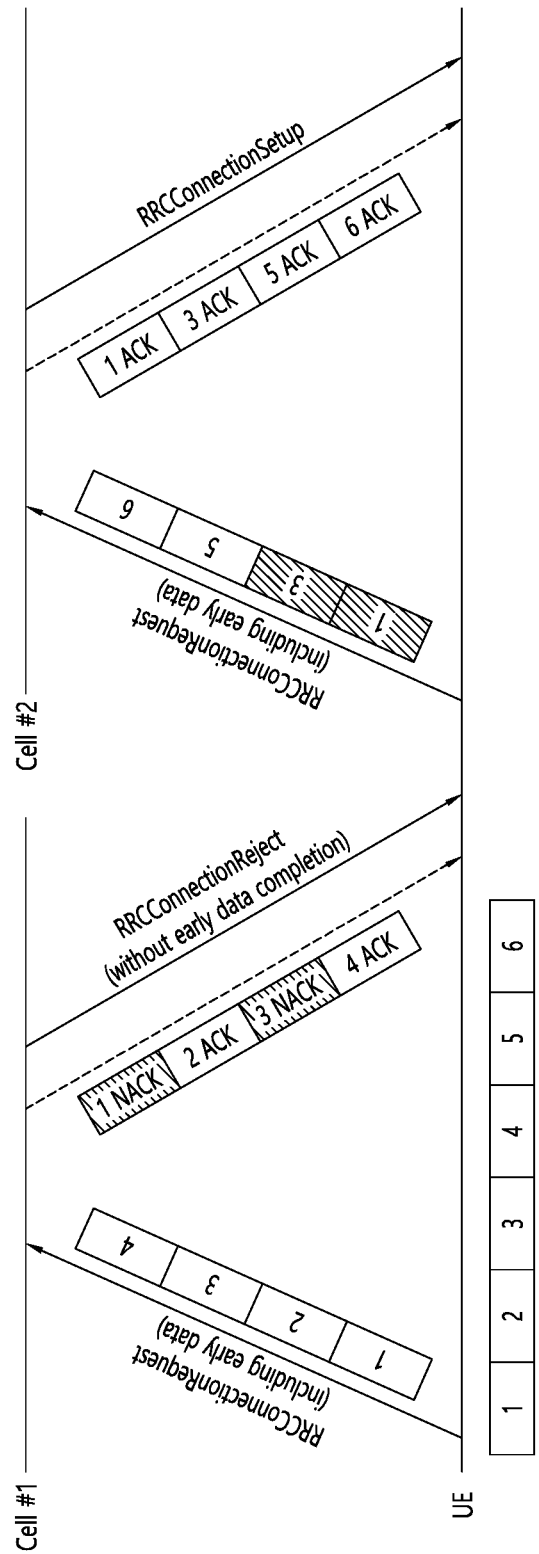
FIG. 7 shows an example of handling failure of early data transmission according to an embodiment of the present invention.

FIG. 7 shows an example of handling failure of early data transmission according to an embodiment of the present invention. Referring to FIG. 7, while the UE camps on cell #1, the UE performs the early data transmission. The UE tries to transmit multiple PDUs, i.e. PDU #1 to PDU #6 during the random access procedure. But UE can only transmit PDU #1 to PDU #4 during the random access procedure, e.g. via the RRC connection request message, since size of data is too large. As a response to the early data transmission, the UE receives ACK for PDU #2 and PDU #4, and NACK for PDU #1 and PDU #3. That is, only PDU #2 and PDU #4 are successfully transmitted to the network. Then, the UE receives the RRC connection reject message on cell #1 without completion of early data transmission, which lead to failure of the early data transmission.

The UE reselects cell #2, which also supports the early data transmission. The UE transmits PDU #1 and PDU #3, which are not successfully transmitted on previous cell #1, and PDU #5 and PDU 6, which are not yet transmitted to the network, during the random access procedure, e.g. via the RRC connection request message. As a response to the early data transmission, the UE receives ACK for PDU #1, PDU #3, PDU #5 and PDU #6. Then, the UE receives the RRC connection setup message, which means completion of early data transmission.

Figure 8:
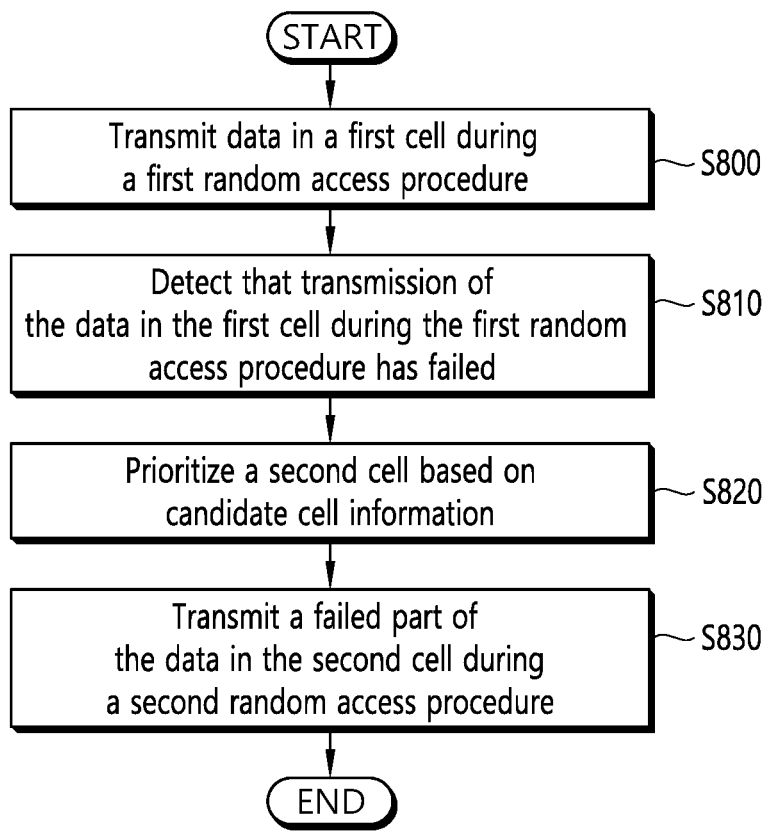
FIG. 8 shows a method for transmitting data by a UE according to an embodiment of the present invention.

FIG. 8 shows a method for transmitting data by a UE according to an embodiment of the present invention. In this embodiment, a cell which is able to support early data transmission during the random access procedure may provide an indication for the early data transmission in the system information, e.g. MasterinformationBlock or SystemInformationBlockType1. Furthermore, a cell may provide a candidate cell list or explicit candidate cell information to enable the UE to figure out which cell supports the early data transmission. Therefore, the UE can know which cell supports the early data transmission without system information acquisition on the candidate cell if needed. If a cell provides a candidate cell list to the UE to indicate which cell supports the early data transmission, the candidate cell list may be provided via the system information, e.g. SystemInformationBlockType3. The candidate cell list may include candidate cell identity and dedicated frequency offset or dedicated cell offset for each candidate cell. If a cell provides candidate cell information explicitly to the UE to indicate which cell supports the early data transmission, the candidate cell information may be provided via dedicated signaling, e.g. RRCConnectionReject message or RRCConnectionSetupComplete message or RRCConnectionRelease message. The candidate cell indication may include the candidate cell identity and dedicated cell offset.

The UE may select and camp a cell, i.e. first cell, which supports the early data transmission. The first cell may be selected by acquiring an indication to support the early data transmission in the system information e.g. MasterInformationBlock or SystemInformationBlockType1. Furthermore, before entering RRC_CONNECTED after cell selection, the UE may perform neighbor cell measurement in RRC_IDLE. The UE may check whether the measured neighbor cells support the early data transmission. If the neighbor cell supports early data transmission, the UE may store information on the neighbor cell. The neighbor cell may be regarded as a cell which supports early data transmission during the random access procedure by acquiring an indication to support the early data transmission in the neighbour cell's system information, e.g. MasterInformationBlock or SystemInformationBlockType1.

In step S800, the UE transmits the data in the first cell during the first random access procedure. That is, the UE tries to enter RRC_CONNECTED and perform the early data transmission during the first random access procedure after (N)PRACH transmission and before the RRC connection setup is completed.

In step S810, the UE detects that transmission of the data in the first cell during the first random access procedure has failed. Specifically, upon receiving the data transmitted by the UE in the random access procedure, the network may response a result of the early data transmission to the UE, i.e. success or failure of the early data transmission. The UE may detect that transmission of the data in the first cell during the first random access procedure has failed when receiving an indication of failure of the early data transmission from the network. The indication of failure of the early data transmission may be received via RRC message, e.g. RRCConnectionReject message or RRCConnectionSetup message or RRCConnectionResume message or RRCConnectionRelease message.

Upon receiving the indication of failure of the early data transmission from the network, the UE may determine candidate cells to transmit the data failed to be transmitted during the random access procedure again. To determine the candidate cells, the UE may check presence of candidate cell information indicating which neighbor cell supports the early data transmission. The candidate cell information may include a candidate cell list or explicit candidate cell information.

The candidate cell information may be obtained by at least one of the following options.

Option 1: The candidate cell information may be obtained by using a candidate cell list. The candidate cell list may indicate cells supporting the early data transmission. The UE may obtain the candidate cell list via system information, e.g. SystemInformationBlockType3, if the UE does not have the valid system information now.

Option 2: The candidate cell information may be obtained by using a candidate cell. The candidate cell may indicated a cell supporting the early data transmission. The UE may obtain the candidate cell via dedicated signaling message which is used to indicate the result of early data transmission, such as RRCConnectionReject message or RRCConnectionSetup message or RRCConnectionResume message or RRCConnectionRelease message. In other words, when the early data transmission performed by the UE is failed, the network may indicate a cell supporting the early data transmission to the UE explicitly while responding the failure of the early data transmission.

Option 3: The candidate cell information may be obtained by using stored cell information. If the network does not provide any candidate cell information to the UE, the UE may check presence of stored information on a cell which supports the early data transmission and provides service before. That is, the UE may store information on the cell on which the UE had entered RRC_CONNECTED before. If the UE had succeeded to perform the early data transmission on the cell before and the cell is not barred now, the UE may consider the cell as a candidate cell by itself Option 4: The candidate cell information may be obtained by using idle measurement result. If the network does not provide any candidate cell information to the UE and there is no suitable cell to perform the early data transmission, the UE may determine a candidate cell by itself with the measurement result in RRC_IDLE. It is because the UE can figure out which neighbor cells are able to support the early data transmission in the random access procedure as mentioned above.

In step S820, the UE prioritizes a second cell based on the candidate cell information for cell (re-)selection. Upon determining the second cell as candidate to support the early data transmission, the UE performs cell (re-)selection procedure based on the candidate cell information. The UE may (re-)select the second cell, since the second cell is prioritized. If the UE has the candidate cell list, the all candidate cells may be considered as the highest priority for cell (re-)selection. The UE may (re)select one cell with the appropriate radio power or radio quality, e.g. reference signal received power (RSRP) or reference signal received quality (RSRQ), as the best cell among the cells in the candidate cell list.

In step S830, the UE transmits a failed part of the data in the second cell during a second random access procedure. That is, if the second cell fulfils the suitable cell criterion, the UE tries to perform the early data transmission on the second cell.

Figure 9:
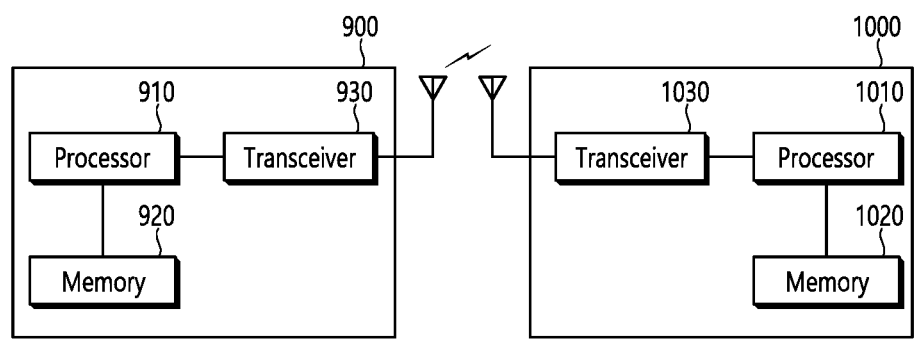
FIG. 9 shows a wireless communication system to implement an embodiment of the present invention.

FIG. 9 shows a wireless communication system to implement an embodiment of the present invention.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

A network node 1000 includes a processor 1010, a memory 1020 and a transceiver 1030. The processor 1010 may be configured to implement proposed functions, procedures and/or methods described in this description. Layers of the radio interface protocol may be implemented in the processor 1010. The memory 1020 is operatively coupled with the processor 1010 and stores a variety of information to operate the processor 1010. The transceiver 1030 is operatively coupled with the processor 1010, and transmits and/or receives a radio signal.

The processors 910, 1010 may include application-specific integrated circuit (ASIC), other chipset, logic circuit and/or data processing device. The memories 920, 1020 may include read-only memory (ROM), random access memory (RAM), flash memory, memory card, storage medium and/or other storage device. The transceivers 930, 1030 may include baseband circuitry to process radio frequency signals. When the embodiments are implemented in software, the techniques described herein can be implemented with modules (e.g., procedures, functions, and so on) that perform the functions described herein. The modules can be stored in memories 920, 1020 and executed by processors 910, 1010. The memories 920, 1020 can be implemented within the processors 910, 1010 or external to the processors 910, 1010 in which case those can be communicatively coupled to the processors 910, 1010 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method for transmitting data by a user equipment (UE) in a wireless communication system, the method comprising:
    transmitting the data in a first cell during a first random access procedure;
    detecting that transmission of the data in the first cell during the first random access procedure has failed;
    prioritizing a second cell based on candidate cell information; and
    transmitting a failed part of the data in the second cell during a second random access procedure.

2. The method of claim 1, wherein the first cell and the second cell support an early data transmission which corresponds to a data transmission during a random access procedure.

3. The method of claim 1, wherein the data is transmitted in the first cell via a first MSG3 of the first random access procedure.

4. The method of claim 1, wherein the failed part of the data is transmitted in the second cell via a second MSG3 of the second random access procedure.

5. The method of claim 1, wherein the candidate cell information includes a list of candidate cells supporting a data transmission during a random access procedure.

6. The method of claim 5, wherein the candidate cell information is received from the first cell via system information.

7. The method of claim 1, wherein the candidate cell information includes information on a candidate cell supporting a data transmission during a random access procedure.

8. The method of claim 7, wherein the candidate cell information is received from the first cell via a dedicated signaling.

9. The method of claim 8, wherein the dedicated signaling indicates that transmission of the data in the first cell during the first random access procedure has failed.

10. The method of claim 1, wherein the candidate cell information includes information about a cell on which the UE had previously succeeded a data transmission during a random access procedure.

11. The method of claim 1, wherein the candidate cell information is obtained by performing measurements on neighbor cells.

12. The method of claim 1, further comprising transmitting a part of the data which is yet transmitted, in the second cell during the second random access procedure.

13. The method of claim 1, wherein the UE is in communication with at least one of a mobile device, a network, and/or autonomous vehicles other than the UE.

14. A user equipment (UE) in a wireless communication system, the UE comprising:
    a memory;
    a transceiver; and
    a processor, coupled to the memory and the transceiver, that:
    controls the transceiver to transmit the data in a first cell during a first random access procedure,
    detects that transmission of the data in the first cell during the first random access procedure has failed,
    prioritizes a second cell based on candidate cell information, and controls the transceiver to transmit a failed part of the data in the second cell during a second random access procedure.

* * * * *